United States Patent
Rodrigues et al.

(10) Patent No.: US 6,408,403 B1
(45) Date of Patent: *Jun. 18, 2002

(54) METHOD FOR INTEGRATING AUTOMATED SOFTWARE TESTING WITH SOFTWARE DEVELOPMENT

(75) Inventors: James Perry Rodrigues, Kirkland; Orville Jay Potter, IV, Redmond, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/526,246

(22) Filed: Mar. 15, 2000

Related U.S. Application Data

(63) Continuation of application No. 08/552,483, filed on Nov. 9, 1995, now Pat. No. 6,067,639.

(51) Int. Cl.[7] .................................................. H02H 3/05
(52) U.S. Cl. ........................................................ 714/38
(58) Field of Search ............................ 714/38, 39, 40; 717/1, 4, 6, 10

(56) References Cited

U.S. PATENT DOCUMENTS

| | | | |
|---|---|---|---|
| 5,450,586 A | 9/1995 | Kuzara et al. | 395/275.5 |
| 5,475,843 A | 12/1995 | Halviatti et al. | 395/700 |
| 5,485,615 A | 1/1996 | Wennmyr | 395/700 |
| 5,490,249 A | 2/1996 | Miller | 395/183.02 |
| 5,513,316 A | 4/1996 | Rodrigues et al. | 395/183.14 |
| 5,522,073 A | 5/1996 | Courant et al. | 395/700 |
| 5,615,333 A | 3/1997 | Juettner et al. | 395/183.14 |
| 5,671,415 A | 9/1997 | Hossain | 395/701 |
| 5,745,767 A * | 4/1998 | Rosen et al. | 395/704 |
| 5,751,941 A | 5/1998 | Hinds et al. | 395/183.14 |
| 5,757,914 A * | 5/1998 | McManis | 380/23 |
| 5,970,145 A * | 10/1999 | McManis | 380/23 |
| 6,067,639 A * | 5/2000 | Rodrigues et al. | 714/38 |

* cited by examiner

*Primary Examiner*—Dieu-Minh Le
(74) *Attorney, Agent, or Firm*—Banner & Witcoff, Ltd.

(57) ABSTRACT

A computer operable method for integrating and automating test procedures within a computer application program. Instantiated test operation objects of an object class defined by the present invention correspond to functions to be tested within the computer application program. The test operation objects are instantiated by calls to functions in a test operation runtime library (DLL). The test operation objects include interface method functions which execute the intended test operation and simulate any required data, file, or memory I/O. Other aspects of the methods of the present invention provide rules which permit decisions as to the applicability of each test operation given the state of the application program or the context of the test operation sequence. The various test operation objects are selected to perform a sequence of test steps. In one mode of operation, the methods of the present invention randomly select among all the instantiated test operation objects. In another mode of operation, the methods of the present invention "playback" a previously recorded sequence of test operation objects to permit reproduction of failures in previous test sequences. In a third mode of operation, the methods of the present invention permit a user to modify or create "playback" files to customize a test case for a particular focus.

3 Claims, 12 Drawing Sheets

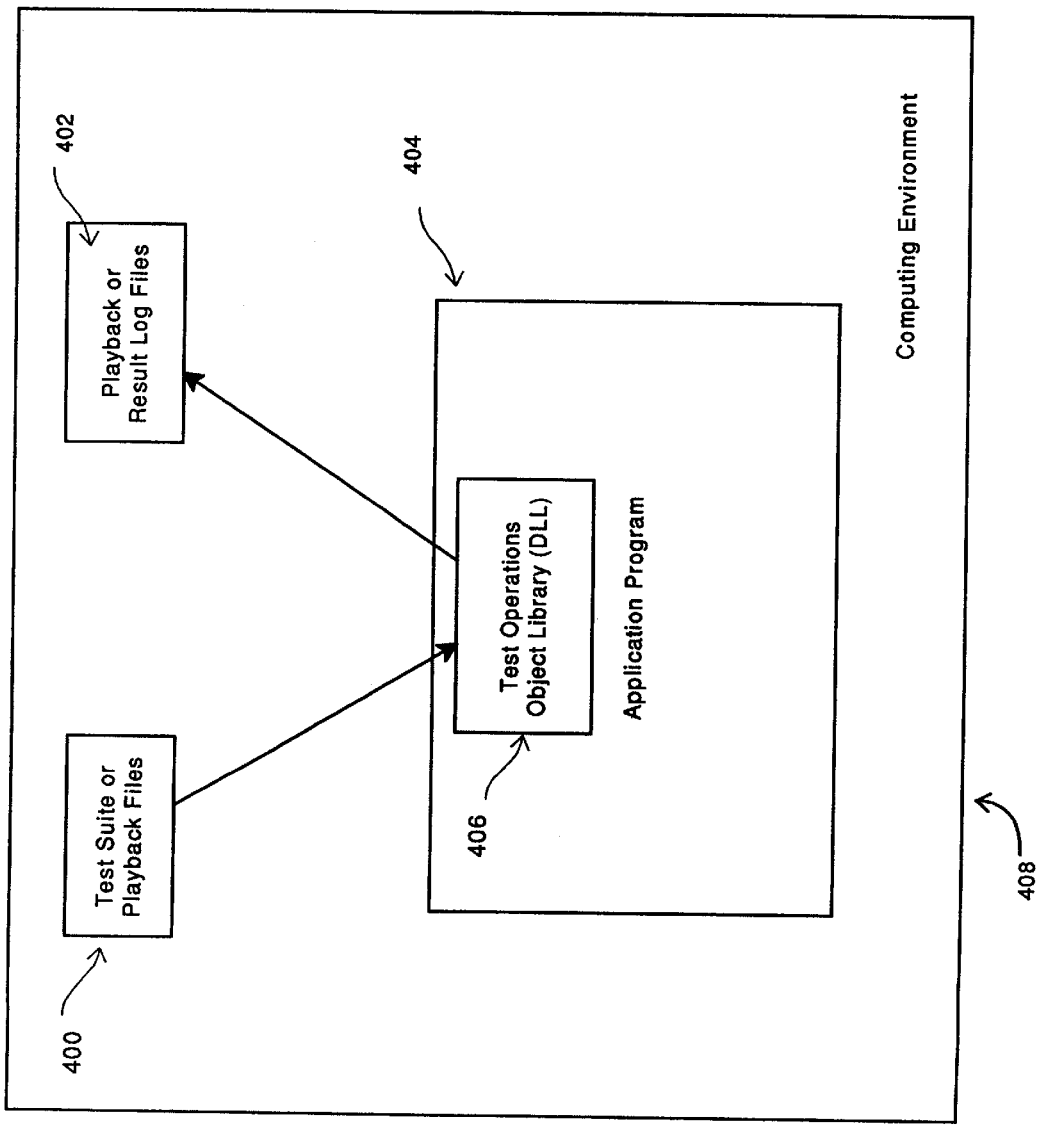

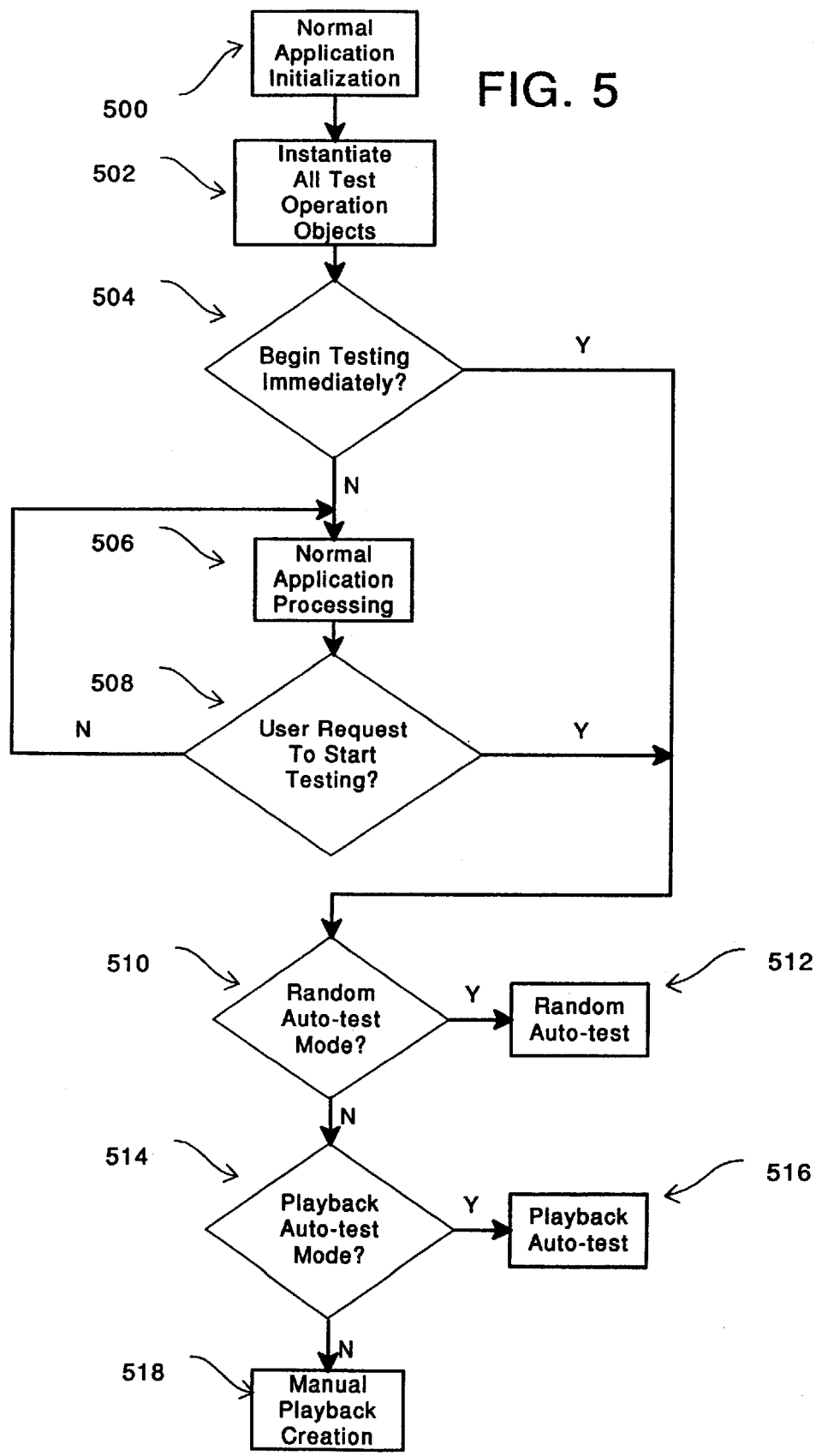

METHOD FOR INTEGRATING AUTOMATED SOFTWARE TESTING WITH SOFTWARE DEVELOPMENT

RELATED APPLICATIONS

This application is a continuation of Rodrigues et al. U.S. Ser. No. 08/552,483, filed Nov. 9, 1995, which issued as U.S. Pat. No. 6,067,639 on May 23, 2000.

FIELD OF THE INVENTION

The present invention relates to the field of computer software development and testing, and in particular, to a method for integrating automated software testing into a product as it is being developed to thereby simplify subsequent software product testing.

PROBLEM

It has been common in the computer software arts that software product development was a distinct and separate process from software product testing. In the standard software product development lifecycle, development engineers would iteratively develop and refine a software product according to requirement or functional specifications. The development engineers frequently would test the product under development either in an ad-hoc manner or in a more rigorous manner. In either case, when the product was deemed to be completed by the development group of engineers, the software product was turned over to the testing process, usually a separate set of engineers from the group that developed the software product. Most, if not all, of the testing process utilized in the development phase would be discarded and the test engineers would begin anew evaluating the software product as against its corresponding product specifications.

In a typical test environment, the test engineers are provided with little or no internal information regarding the structure and design of the code comprising the software product. The testing effort would then proceed in a "black box" manner by applying test data (an external stimulus) and observing the output of the software product for proper response. In its crudest form, a test engineer determines ("dreams up") potentially interesting test inputs and applies them to the software product while observing the output behavior of the software product for proper operation. This form of manual testing permits wide flexibility for the test engineer in creating input stimuli but provides little assistance to the test engineer in reproducing problems found during the test sequence. Manual test requires the test engineer to carefully note the sequence of test inputs which led to a specific problem test result.

Test engineers have developed or utilized a number of tools to assist in such "black box" testing. To automate the above discussed manual test process, scripting and macro languages are frequently used. The script/macro tool allows some degree of automation in the test sequence to aid in reproducing intermittent failures. A macro tool permits some added flexibility in the use of variables to customize the operation of the script based on externally supplied variable inputs. Some software products (e.g. word processing programs or spreadsheet programs) offer built-in macro features to reproduce sequences of user input keystrokes. Other program user interface (UI) environments (such as the Xwindows programming environment) provide for redirection of a program's input from a script/macro file and thus may automate the testing of specific user keystroke sequences.

Simple "BAT" files in the MS-DOS® environment or "shell scripts" in the UNIX® environment are exemplary of such scripting tools used to partially automate the software product testing process. Macro facilities in the "BAT" file or "shell script" interpreters and other macro replacement programs such as "m4" or "perl" in the UNIX® environment are exemplary of macro facilities used to enhance the scripting facilities in automating software product testing.

However, such scripting/macro based testing tools still provide little or no assistance to the test engineer in observing the software product output to automatically detect success and failure of each test. Collection and analysis of the test results remains largely a manual procedure. Correlation of the gathered test output with the timing and operation of the software product is difficult if not impossible.

An additional problem with scripting/macro tools arises in that the tool itself as well as the test scripts themselves must be ported to each computing environment in which the software product is to be tested. For example, a particular operation in a PC based Microsoft Windows® application may be tested by simulating an "OPEN" menu operation while a similar function may require an "OK" menu operation in an Apple Macintosh® computing environment. The test scripts would have to change to test the same function in these two exemplary computing environments. In other words, the testing of underlying functions of an application may have to change as the user interface changes over a variety of computing environments. This creates an additional burden in porting and inaintaining the test tools and test scripts along with the software products. In addition, the porting and maintenance of the scripting/macro tools and test cases can be a source of additional errors which may be erroneously attributed to the failure of the software product under test.

Scripting/macro based test tools also tend to vary depending upon the external stimuli needs of each software product under test. The user interface for the test engineer using "black box" automated test tools tends to vary as the needs of each software product vary. Test engineers therefore must potentially learn a new user interface mode of operation for each software product to be tested.

All such "black box" testing methods, with or without the aid of automated scripting/macro testing tools, are typically performed without knowledge of the software product's internal code structure. This lack of structural knowledge can make testing more cumbersome and time consuming. The lack of structural knowledge precludes certain styles of testing which may focus on particular error prone aspects of the software product revealed only by knowledge of the software product's internal structure. Sometimes, for example, an error in one operation of the software product may not be externally observable in the output of the software product until subsequent operations are performed. The combination of the operations may eventually reveal the problem in an external manifestation, but the sequence of event may be lengthy back to the actual cause of the problem. Thus the use of external stimuli ("black box") test methods, even in association with various automated test tools, does not permit the test engineer to exercise judgement with respect to problems more easily located through testing with knowledge of the software product's internal code structure.

In addition, as software products evolve with ever increasing complexity, the burden of testing is being shifted more toward the development teams. It is simply impossible with "black box" testing techniques to exhaustively test all possible inputs (external stimuli) of many software products regardless of the size of the testing staff. Even testing of a large portion of the possible inputs is a difficult task in many cases. Therefore, the software development/testing lifecycle has begun to shift more of the testing efforts onto the responsibility of the development staff. For example, it is more frequent now that "acceptance testing"(testing for fundamental functionality) is made a part of the responsibility of the development staff. An added benefit of shifting some test burden to the development group is realized in the knowledge of internal code structure of the software product. The code structure knowledge of the development group may be applied to focus the testing effort on test sequences and scenarios most likely to create problems. In addition, the developers may construct the test cases to detect the failure in the test sequence as early as possible. It is a problem for developers to create a standardized test interface for the automated performance of test sequences in a manner that permits easy reproduction of the failed test sequences.

It is apparent from the above discussion that a need exists for an automated testing tool which permits a standardized interface for the generation and execution of test cases, which permits random sequences of testing, which permits easy reproduction of failed test sequences, and which automatically senses the success or failure of each test step.

SOLUTION

The present invention solves the above identified problems and others to thereby advance the state of the useful arts by providing an easy to use, coding standard and user interface for a software developer to integrate testing of a software product into the development of the product. The testing application program interface (test API) is used by an application program developer to integrate a standardized test interface into the software product in its development phase. Use of the test API by the application program invokes standard functions in a dynamic linked library (DLL) to initiate a standard test user interface when the application program is run. The test tools are integrated into the application program and are therefore ported to any new computing environment by simply porting the application program to that environment. The development engineer, possibly in cooperation with the test engineers, thereby designs the test capability into the application program from its inception. These test hooks, combined with the standard, easy to use, graphical user interface of the test tools of the present invention, permit any engineer in the product development team to test the product. Development engineers may more effectively test the application program during its development phase to reduce the number of problems discovered later in the product's lifecycle. Test engineers may apply the same easy to use graphical interface to more thoroughly test the functionality of the product.

The test API functions in the DLL provide a consistent, friendly, easy to use interface for testing of the application program. The DLL test functions may be operated in a random mode to generate pseudo-random test sequences. The DLL test functions automate recording of the pseudo-random seed and the corresponding sequence of test steps for easier reproduction of problems generated in the random sequence. The DLL functions can be used to automatically determine the success or failure of the corresponding test step by sensing a return value from the invocation of a corresponding sequence of execution in the application program. In addition, the application program may directly invoke other DLL functions to record an application failure. This alternative method is referred to herein as the assertion method.

The application programmer determines the operations to be tested in the application program and instantiates a test operation object (of a predefined test API object class) corresponding to each operation to be tested. The test operation object identifies an execute interface method (provided by the application programmer) to be invoked to execute the desired operation. Other interface methods of the test operation object identify functions which are to be performed to simulate the generation of input data and the acceptance of output data in response to operation of the execute interface method. For example, one interface method provides functions to be invoked for the manual or automatic generation of input data to test the operation. Another interface method of the test operation object provides functions to be invoked in response to I/O requests of the operation under test. Another interface method of the test operation object defines a set of rules to permit decisions to be, made in the invocation of the test object.

The application program is designed by the development engineers with the test operation objects defined as part of the application program. The application program is then compiled and linked with the test tool library (DLL) to provide the standard object class manipulation test methods of the present invention. By defining the test operation objects as discussed above, the application programmer has provided information (in the form of a collection of instantiated objects) useful to the test methods of the present invention to invoke each test operation and detect success or failure of each tested operation. Since the test operations are designed into the application program, and the library functions which implement the test operation classes of the present invention are available in a variety of computing environments, the application program may be more easily tested in many environments without the need to port unique test tools to each new computing environment. The test tools can be readily available in any computing environment to which the development staff chooses to port the application program. In addition, the test tools of the present invention, unlike scripting and macro methods of the past, do not require the development or testing teams to port the test cases between the various computing environments on which the program is to be tested. The test tools of the present invention are available for all platforms on which the application program may be run. The test suites are recorded in a portable manner by the test tools of the present invention in so-called playback files.

The application program is designed by the application programmer to invoke the test tool at an appropriate stage in the runtime-startup or processing of the application program. The test tool may then be operated in one of three modes: namely, random automated test operation selection, playback automated test operation selection, or manual playback creation mode.

In the random automated test selection mode, the test methods of the present invention pseudo randomly select from among the set of instantiated test operation objects defined by the application programmer. As each test operation object is randomly selected, the execute function method associated with the object is invoked to perform the developer's designed test function. The random selections are logged in a playback file to permit later reproduction of a failed sequence. In addition, the results of each execute function method invocation are logged in a file by the methods of the present invention so that a sequence may be reproduced if it produces a problem in the application program under test. This process continues randomly selecting test operation objects for which the corresponding execute function is invoked until directed to stop by a user or other termination conditions are met.

In the playback automated test operation, the test operation selections made in a previous test sequence are replayed from the playback file created during an earlier performance of the test sequence. This mode of operation is used, for example, to permit reproduction of test sequences which led to erroneous results in previous invocations.

The manual playback creation mode of operation permits a user of the present invention to create or edit a playback file. This mode allows the user finer control over the test sequencing to more rapidly debug an application program.

The methods of the present invention enable automation of the testing of an application program while integrating the test cases with the program development. This integration of the test case and program development permits more thorough analysis and regression of the application program. The automation aspects of the test methods of the present invention permit easier, unattended test operation to more effectively test an application program.

BRIEF DESCRIPTION OF THE DRAWINGS

FIG. 4 is a block diagram depicting the relationship between script oriented external test tools and an application program as improved by the tools and methods of the present invention;

FIG. 5 is a flowchart depicting the control flow of an application program with test operation objects embedded therein in accord with the present invention;

DETAILED DESCRIPTION OF THE INVENTION

Figure 1:
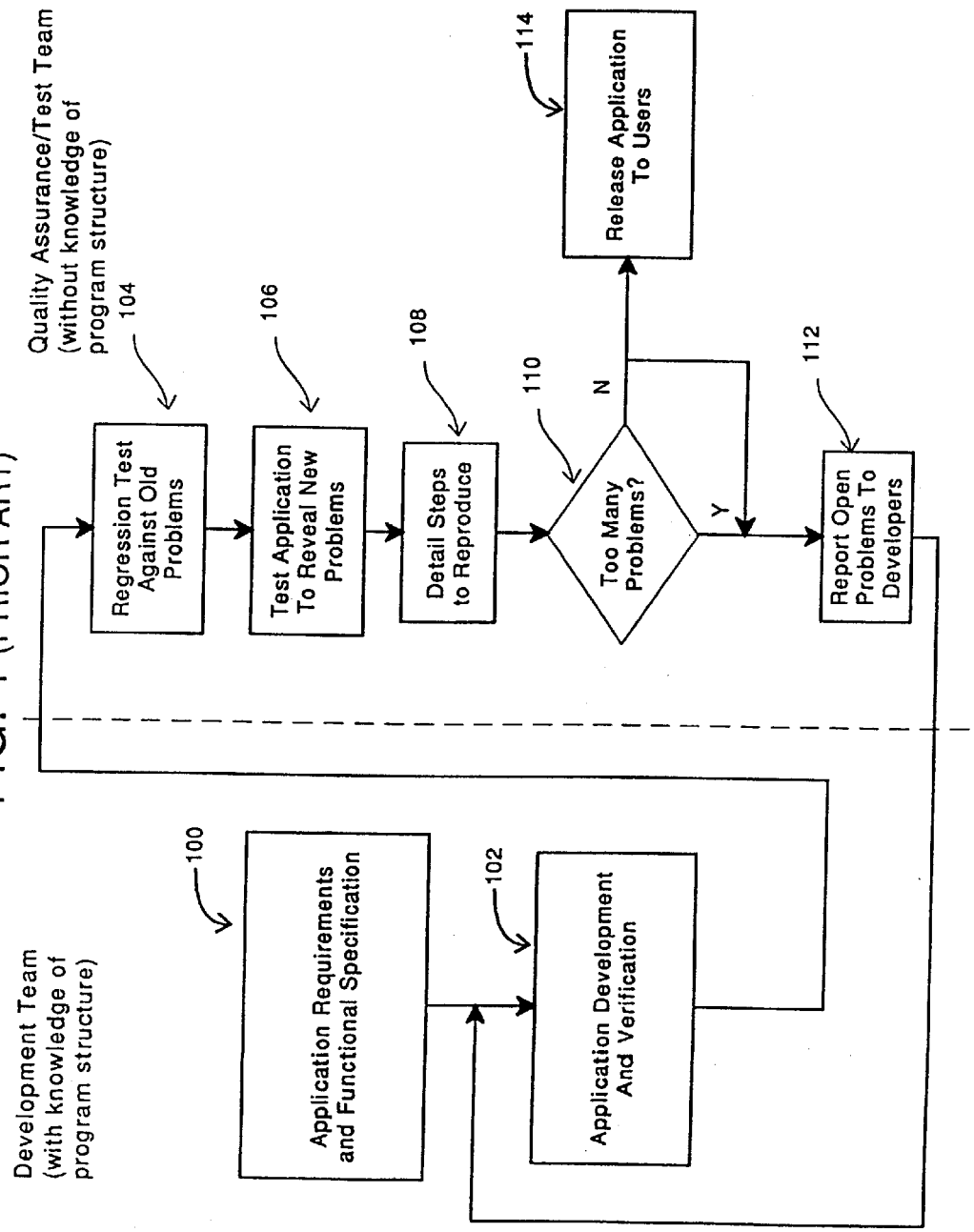
FIG. 1 is a flowchart depicting the lifecycle flow of an application program through development and test as presently known in the art.

OVERVIEW—PRIOR ART:

FIG. 1 describes the overall flow of a typical software development and test life cycle for an application program product. A vertical dashed line in the middle of FIG. 1 delineates tasks performed by a development team on the left side of the dashed line, and tasks performed by a quality assurance or a testing team on the right side of the dashed line. It is axiomatic that the development team has extensive knowledge of the internal structure of the application program. By contrast, it is common in present software development and test environments that the quality assurance or testing team operates using "black box" techniques (applying stimuli and observing results without such knowledge of the structure of the application program). In this typical software development and test environment, the development team helps determine the requirements and functional specification of the application program as depicted in element 100. In element 102, the development team develops appropriate programs and data structures to implement the requirements and functional specifications. In conjunction with the development thereof, the development team verifies or validates the program against the requirements and functional specifications. In this typical application program development process, the development team has thus completed its task and provides the application program to the quality assurance or testing team for independent testing and verification of the application program.

In element 104, the quality assurance or testing team performs a regression test to verify that previously reported and fixed problems have not recurred in this new version of the application program. Next, at element 106, the quality assurance or testing team performs new testing of the application program to reveal potential new problems arising in the current version of the application program. Due to the nature of the prior testing tools, the test team must initiate measures at element 108 (often manual) to document the steps required to reproduce the new problems discovered.

At element 110, the quality assurance or testing team determines whether or not the number and severity of revealed problems are too high to permit release of the application program to potential users. If it is determined that the number and severity of problems revealed is not too high, the quality assurance or testing team will release the application program to potential users as depicted in element 114. If the number or severity of the problems revealed is too high, the quality assurance or testing team does not release the application program to potential users, but rather reports the open problems to the development team as depicted in element 112. In parallel with release of the application program as depicted in element 114, the quality assurance or testing team will also report the open problems to the developers as shown by element 112. With the report of open problems returned to the development team, the development team repeats its previous efforts in element 102 to re-design the application program to resolve problems reported by the quality assurance or testing team. This cycle, elements 102–112, repeats until the quality assurance or testing team finds no remaining problems in the application program worthy of reporting to the development team.

Figure 3:
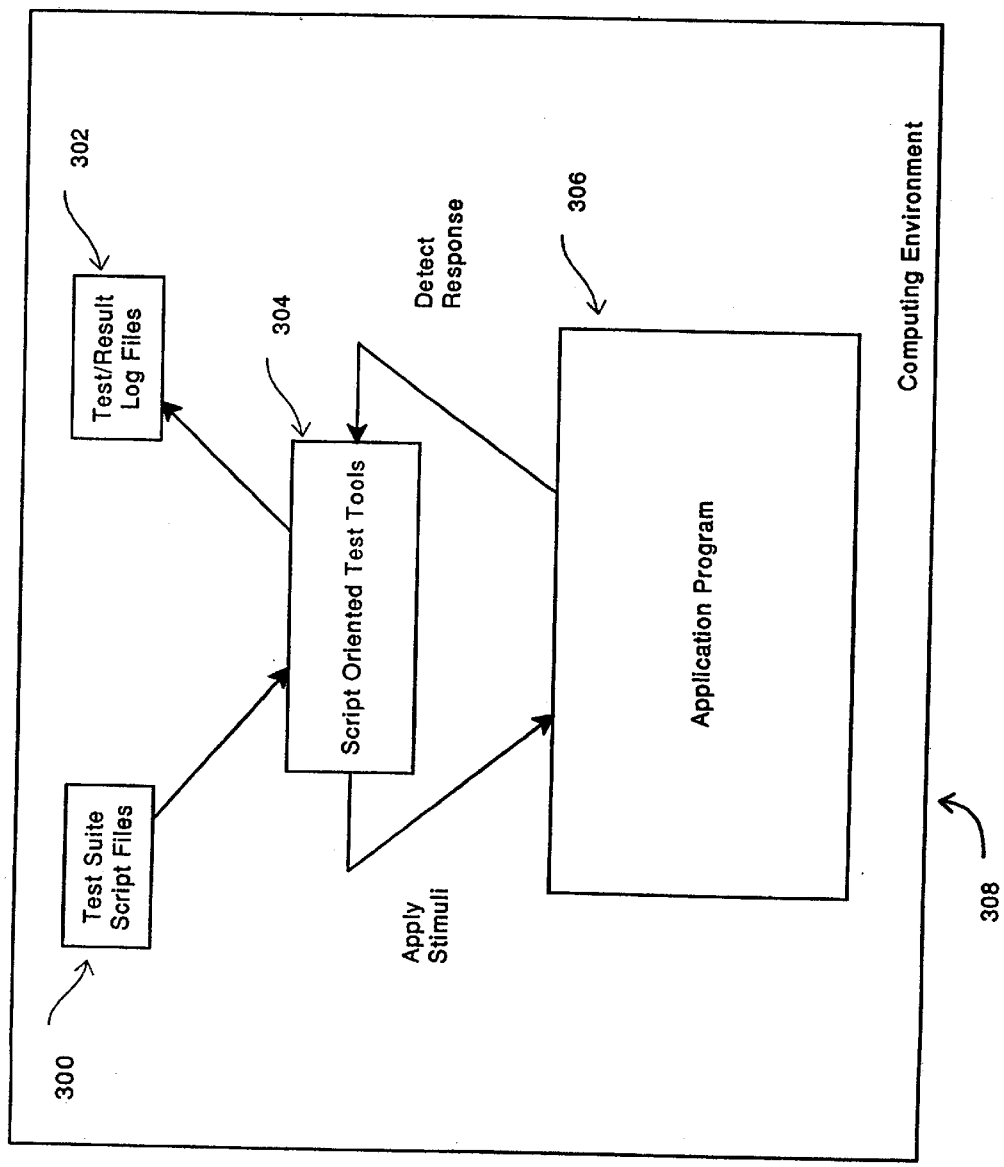
FIG. 3 is a block diagram depicting the relationship between script oriented external test tools and an application program as known in the art.

FIG. 3 depicts a typical computing environment 308 in which the quality assurance or testing team performs their testing function. A typical testing approach involves the use of a script oriented test tool 304 to apply external stimuli to application program 306. The application program receives the externally applied stimuli as a simulated user input and generates an appropriate response by performing its designated function on that provided input. The script oriented test tool 304 detects the response generated by the application program 306 to verify proper operation of the application program 306 in response to the applied stimuli. Script oriented test tool 304 may receive inputs from test suite or script files 300, which describe a sequence of test steps to be executed. The test tool 304 also logs the test results and progress into log files 302 for further analysis.

Script oriented test tool 304, typical of current test procedures, is external to application program 306. Due to this limitation, script oriented test tool 304 can only apply external stimuli that are expected, and accepted, as external user inputs by the application user program 306. No intermediate levels of functionality testing below that which is made visible to the user interface is possible with this external testing approach. Similarly, script oriented test tool 304 can only detect responses from application program 306 that are made externally visible by the application program. Script oriented test tool 304 is thus limited in its internal knowledge of the structure and design of the application program 306 and limited to only those stimuli and responses that are provided to the external user interface of application program 306. For example, a typical response of an application program 306 may be no more than the update of a display screen to a user interface. Such a response may be detected by script oriented test tool 304 only by capturing the screen dump and storing it for subsequent manual review by a test operator. In this manner, automation of the testing procedures is made more difficult because the detection of the application program 306 response is frequently difficult to automate.

Hand generated testing is a variant of the test tool computing environment depicted in FIG. 3. In a hand generated test environment, a test engineer hand generates a desired external stimulus rather than receiving a stimulus from a pre-defined script file 300. Such hand generated testing limits the reproducability and automation of the test procedures in terms of the generation of external stimuli. The test engineer must be certain that all steps which lead up to production of a problem are noted so that the problem may be reproduced. So called "macro" languages are yet another variant of the test procedure depicted in FIG. 3. Macro language test tools are similar to the script oriented test tool 304 but with reduced capabilities for detecting and recording the response from application program 306. In essence, macro language test tools provide a shorthand notation for defining a test script of external stimuli to be applied in sequence.

The well known application program development test cycle and associated tools depicted in FIGS. 1 and 3, therefore, have several weaknesses as compared to the techniques disclosed by the present invention. Specifically, script oriented test tool 304 is only capable of testing those functions made externally visible by the application program 306. Similarly, detection of responses generated by application program 306 is limited to those responses made visible by the application program. Some such responses may be difficult to capture or detect in any automated way by script oriented test tool 304. An additional problem with the script oriented test tool 304, of FIG. 3, arises in the need to port the test tool 304 to each new computing environment 308. The application program 306 development team normally ports the application program 306 to several different computing environments 308. In addition, either the quality assurance or testing team or the development team must port the script oriented test tool 304 and/or the script files 300 to the same collection of computing environments 308 independent of the efforts to port the application program 306. This imposes an additional work load upon the product development and test in addition to the normal load for developing the product and identifying problems in the application program 306.

OVERVIEW—PRESENT INVENTION:

The testing tools and methods of the present invention involve embedding of test operations within the structure of the application program during development. By so embedding test operations within the application program, the development team (with the aid and consultation of the test team) determines appropriate functions and operations to be tested. In addition, the development team determines the expected proper response for each identified test operation embedded within the application program. The testing tools and methods of the present invention further provide a standardized, easy to use, graphical, user interface for the performance of test operations on the applications program. By embedding test operations within the application program, complete automation of test procedures can be achieved both in provision of stimuli by calling functions, and in the capture of test results by verifying the return code value of a called test operation function or by direct assertion function calls of the application program to detect failures. These automated test procedures may be used throughout the development portion of the software life cycle by the development team or by the test team. This integration of the testing of the application program with its development eliminates the distinct division of labor typical of prior product testing approaches. Knowledge of the program structure is no longer required to effectively and robustly test the application program. The development team and the test team may act in concert as a unified group to assure quality in the application program product.

Figure 2:
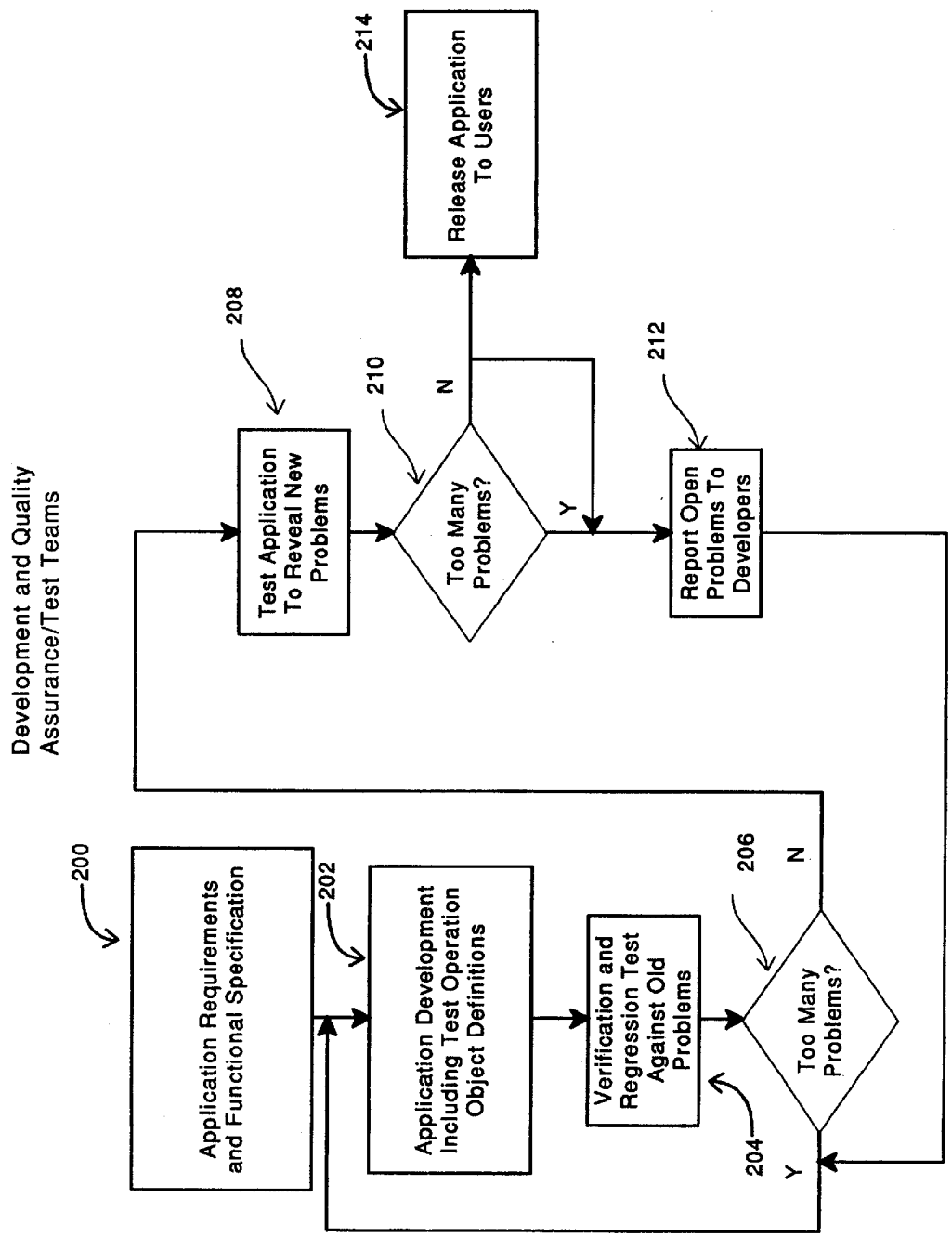
FIG. 2 is a flowchart depicting the lifecycle flow of an application program through development and test as improved by the tools and methods of the present invention.

FIG. 2 depicts a software development and test process which may utilize the tools and methods of the present invention. Unlike the process depicted in FIG. 1, there is no vertical dashed line indicating the separate responsibilities of the development team and those of the quality assurance or testing team. Since there is no longer the need for strict division of responsibilities under the methods of the present invention, the two teams are referred to under the methods of the present invention as the product development group. The product development group, by operation of elements 200 and 202, defines the requirement specifications for the application program and develops appropriate program and data structures to implement those requirements. In element 202, the product development group embeds test operation object definitions within the program structure of the application program under development. These test operations object definitions are derived from object class definitions provided by the tools and methods of the present invention. By embedding the test operation object definitions within the application program (in element 202), the product development group aids in the testing of the application program by providing interfaces for testing functionality not otherwise visible external to the application program structure. This embedding of test operation objects allows automation of the testing procedure for generating test stimuli as well as automated capture and analysis of the test results. In addition, the embedding of the test object definitions permits a broader range of test functionality to be provided as compared to the external testing approach depicted in FIGS. 1 and 3. By operation of elements 204 and 206, the product development group performs regression testing of the application program by use of the test tools and methods of the present invention as embedded within the application program by the test operation object definitions. In elements 204 and 206, the product development group determines whether too many problems are revealed through a verification and regression testing. If too many problems are so revealed, the product development group repeats the steps of elements 202–206. The product development group next tests the application in elements 208 and 210 to determine if too many new problems have arisen in the current version of the application program. If the application program is determined to be sufficiently problem free by operation of element 210, then the program is released to application users as duplicated in element 214. In either case, all newly discovered problems are reported for the development group to consider as shown in element 212. The reported open problems returned to the product development group to repeat the program development cycle in hopes of repairing the problems.

The tools and methods of the present invention permit the shift in testing paradigm depicted as between FIGS. 1 and 2. Whereas under prior approaches all testing, regression testing, as well as new testing, was the responsibility of a distinct quality assurance and testing team, the tools and methods of the present invention permit highly automated testing to be performed at any time in the application program development lifecycle.

The tools and methods of the present invention are shown in a block diagram of FIG. 4. Application program 404 is operable within computing environment 408. Embedded within application program 404 are test operation objects 406 adapted to permit automated testing of functions within application program 404. The test operation objects 406 are derived (by the application programmer developers) from an object class provided in a programming library of the present invention. The library is provided in the form of a dynamic link library (DLL) to be invoked by application program 404. The test operations object library 406 receives pre-recorded pseudo-random test suite files or playback files 400, and logs all testing procedures to playback files and results to log files 402. As shown in FIG. 4, the tools and methods of the present invention embed the test operations 406 within the application program 404 at the time of its development by the product development group. By embedding the test operation objects library (DLL) 406 within application program for 404, the developers may expose more functionality for testing than is otherwise possible in prior test methods which exercise only externally visible user interface functions. In addition, the results of each test operation may be automatically verified by validation of the return code value from the invocation of each test operation object. An additional benefit of the test tools and methods of the present invention is derived from the fact that porting of the application program to a particular computing environment 408 automatically performs the required porting of the test operations embedded within the application program. There is no additional effort required to port testing tools to each computing environment along with the application program itself.

TEST TOOL OPERATIONS:

FIG. 5 is a flowchart of the operation of an application program which has embedded the test tools and methods of the present invention. Element 500 represents the normal initialization procedures for the application program. These operations include whatever data and code initialization is required to properly perform the intended function of the application program. Element 502 is next operable to instantiate all the test operation objects defined by the product development group (and derived from the object class definition provided by the DLL). The instantiation of the test operation objects involves creating the objects and the associated interface functions and making them known to the test tools which actually perform the testing sequences. In addition, as discussed below, element 502 is operable to define groups of related objects for simplifying the user interface to the test tool. Instantiating each test operation object provides the definition of the objects to be tested by the testing tools of the present invention. A table is built within the test tools of the present invention in which each entry corresponds to one of the defined test operation object. As discussed below in further detail, grouping of related objects and weighting of the various objects are utilized in the automated testing procedures to select appropriate tests to be invoked.

Element 504 determines whether the user has requested that testing begin immediately or be deferred until some subsequent time in the processing of the applicable program. If the testing is to begin immediately, processing continues below with element 510. If in the alternative, testing is deferred until some subsequent time, processing continues with elements 506 and 508 repetitively until it is determined by element 508 that the user has requested the commencement of testing procedures. Until that time, element 506 represents all normal processing of the application program performing its intended function. The determination of whether to begin testing immediately or to defer until a later, user specified, time is a matter of design choice. One of ordinary skill in the art will recognize the potential value in deferring the start of testing until a particular state of the application program is created (by manual operation of the program). Many equivalent design choices may be made by those practicing the present invention to implement a desired delay in the commencement of a test sequence.

When testing procedures are begun, elements 510 and 514 are operable to determine which of three possible modes of testing operation are to be performed. The test tools of the present invention may be operated in a random auto-test mode, a playback auto-test mode, or a manual playback creation mode. Element 510 is operable to determine if random auto-test mode has been selected. If so, element 512 is next operable to perform the random auto-test procedures. If not, then element 514 is operable to determine if the playback auto-test mode has been selected. If so, element 516 is operable to perform playback auto-test operations. Otherwise, element 518 is operable to perform manual playback creation procedures. Once begun, elements 512, 516, and 518 are operable until completion of the testing procedures.

Figure 6A:
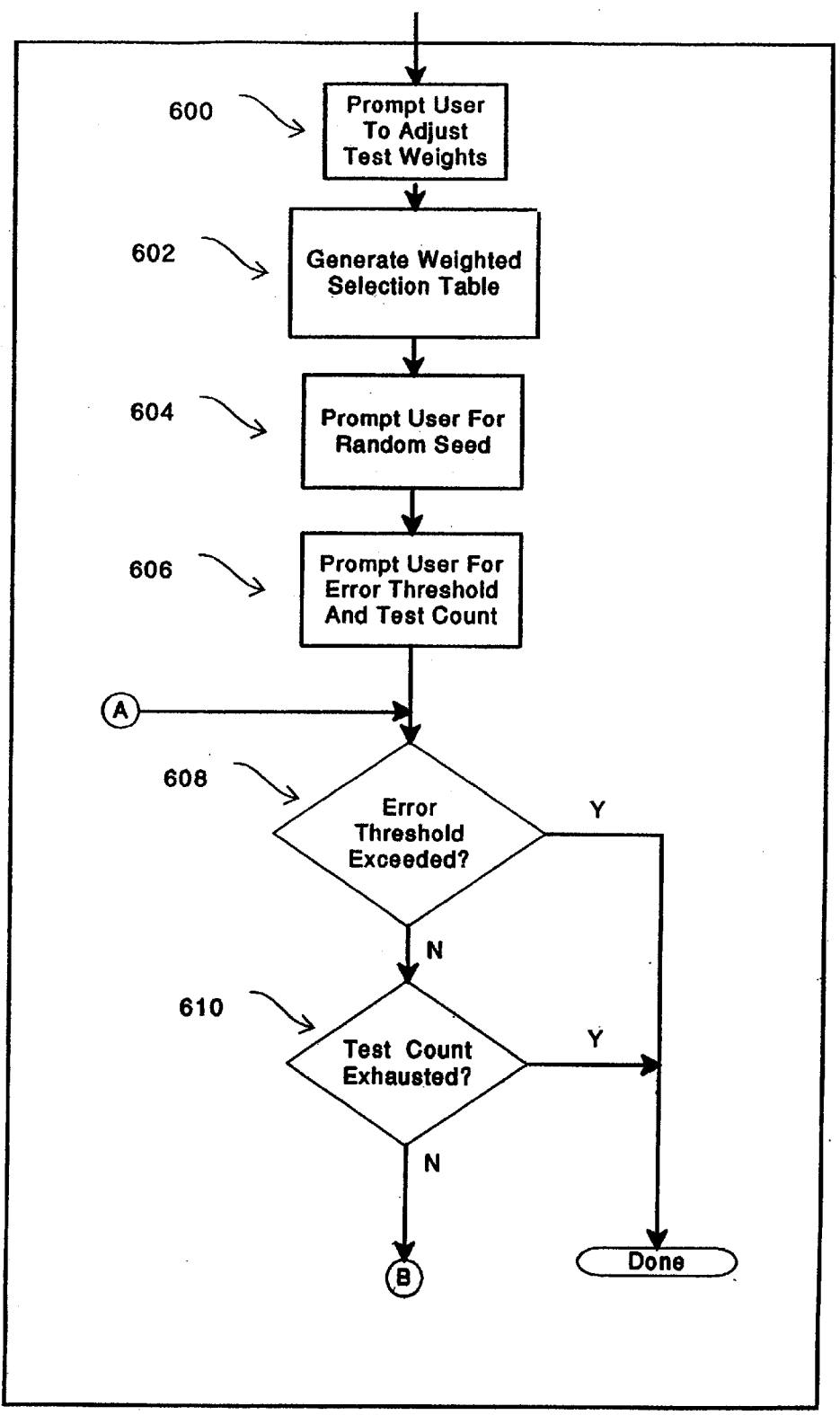
FIG. 6A is a flowchart showing additional detail of the random test operation element of FIG. 5.

FIG. 6A depicts a flowchart of the detailed operation of random auto-test element 512 of FIG. 5. In the random auto-test mode, test operation objects are randomly selected for invocation to test the application program. The user may provide weighting values to increase the frequency of certain groups of tests being selected as compared to other groups of tests as will be discussed in additional detail below. Element 600 is operable to prompt the user for input used to adjust the default weighting values applied to each test operation object. Based on the default weighting values, plus any adjustments entered by the user in operation of element 600, element 602 is next operable to generate weighted selection tables used for randomly selecting each of the test operation objects according to the weighting provided by the user.

A weighting table specifies a range of random number values which correspond to each entry in the table. The ranges of possible random numbers is equal to the total of the weight values for all entries in the corresponding table. A weighting table is first generated for the current group weight values to determine which group will be selected. When selecting a test operation object, a first random number is generated in the range of zero through the total of all group weights (minus one). The group whose assigned range of numbers encompass the randomly generated number is then selected. After the group is randomly selected, a weighted selection table is generated for the test operation objects according to the current weight values for test operation objects in the selected group. A second random number is then generated to select from the test operation objects defined as members of the selected group. The test operation object whose assigned range of numbers encompass the second randomly generated number is then selected. For example, if test objects "A" and "B" are in group "X" and test objects "C" and "D" are in group "Y", and the object and group weights are as follows:

| Object/Group | Group Weight | Object Weight |
|---|---|---|
| X | 60 | |
| Y | 30 | |
| A | | 20 |
| B | | 10 |
| C | | 100 |
| D | | 150 |

Then the group weighted selection table would reflect the group weights as follows:

| Group | Random Number Range |
|---|---|
| X | 0–59 |
| Y | 60-89 |

The test operations weighted selection table if group X were randomly selected would appear as follows:

| Group X Object | Random Number Range |
|---|---|
| A | 0–19 |
| B | 20-29 |

The test operations weighted selection table if group Y were randomly selected would appear as follows:

| Group X Object | Random Number Range |
|---|---|
| C | 0–99 |
| D | 100-249 |

Element 604 is next to operable to prompt the user to enter a random seed value. The random selection in the random auto-test mode is performed via pseudo-random number generation techniques. A sequence of "random" numbers generated by such a pseudo-random number generator technique may be repeated if the random number generator is provided with the same seed value. Such techniques are well known to those of ordinary skill in the art and need not be discussed further. In order to assure reproducability of any problems found, the random number seed value used to previously produce the problem may be manually reentered by the user so as to reproduce an identical "random" sequence of test operations. Element 606 is next operable to prompt the user for input parameter values indicating the threshold for the number of errors allowed and the total count for the number of test operations to be performed. The threshold and count values are used to determine the length of time the test procedure will be run and a threshold limit at which testing will be halted. If the number of problems revealed is below the threshold value testing will proceed, otherwise testing is halted when the number of errors exceeds the threshold value. Similarly, the total test count value is used to determine the number of random test operation objects to be invoked in the random auto-test mode.

Elements 608–626 are performed repetitively until testing procedures are halted. Element 608 is operable to determine whether the specified error threshold has been exceeded. If so, testing operations are halted and the test function has completed. If not, element 610 is next operable to determine whether the total count of test operations has been exhausted. If so, testing is completed. If not, processing continues by selecting another test operation object invocation.

For each test operation object invocation, elements 612–626 perform the actual test operation. Element 612 is first operable to adjust the weighted selection table for any changes in the weighting values. Changes in the weighting values are the means by which rules, discussed below in additional detail, may alter the testing strategy as the test process proceeds. Element 614 is next operable to generate a pseudo-random number value for use in the weighted selection table to select the next test operation object. The pseudo-random number value may be used as an index value into the weighted selection tables as described above, or otherwise utilized with data structures, well known by those of ordinarily skill in the art, in a manner indicative of the weighted selections. Element 616 is next operable to record the selected test operation object in a playback file. A playback file may be utilized in a subsequent test procedure to reproduce a problem revealed in random test sequencing. The selected test operation object is recorded in the playback files before the test is performed to assure that the playback file records each test in sequence before the test operation execution potentially hangs the application program (indicative of a problem in the application program). The test procedures and methods of the present invention also permit system exception handling to be intercepted by the test methods to detect unexpected results in the test operation object invocation. This capability of the present invention depends upon the computing environment capabilities on which the application program (with the test methods embedded) is run.

Element 618 is next operable to invoke the execute interface function of the selected test operation object in order to execute the test procedures defined by the product development group corresponding, to this selected test operation object. The execute function is defined by the product development group to perform whatever functional processing is appropriate to test the desired function corresponding to the test operation object. Details of an execute function are discussed below with respect to exemplary test operation objects. The result's of the execution interface function is recorded by operation of element 620 in a result log file. An execute interface function may indicate its success or failure by returning a specific result code as the function value or by calling an assertion function in the library methods of the present invention to indicate an erroneous test result. The result log file may be inspected later to determine whether the test sequence failed or succeeded, and in addition, may be used to determine at which step in the test procedures, as indicated in the playback file, the test sequence failed. Element 622 is operable to determine whether the test execute function result represents a successful or failed invocation of the execute interface function. If the execute interface function invocation resulted in an error, element 624 is next operable to increment the error counter. If the execute interface function resulted in a successful completion, then the error counter is not incremented and operation of element 624 is skipped. Element 626 is finally operable to decrement the total test count. The test process then continues by looping back to elements 608 and 610 which verify that test processing should continue or should be halted based on the error count and the total test count remaining.

Figure 7:
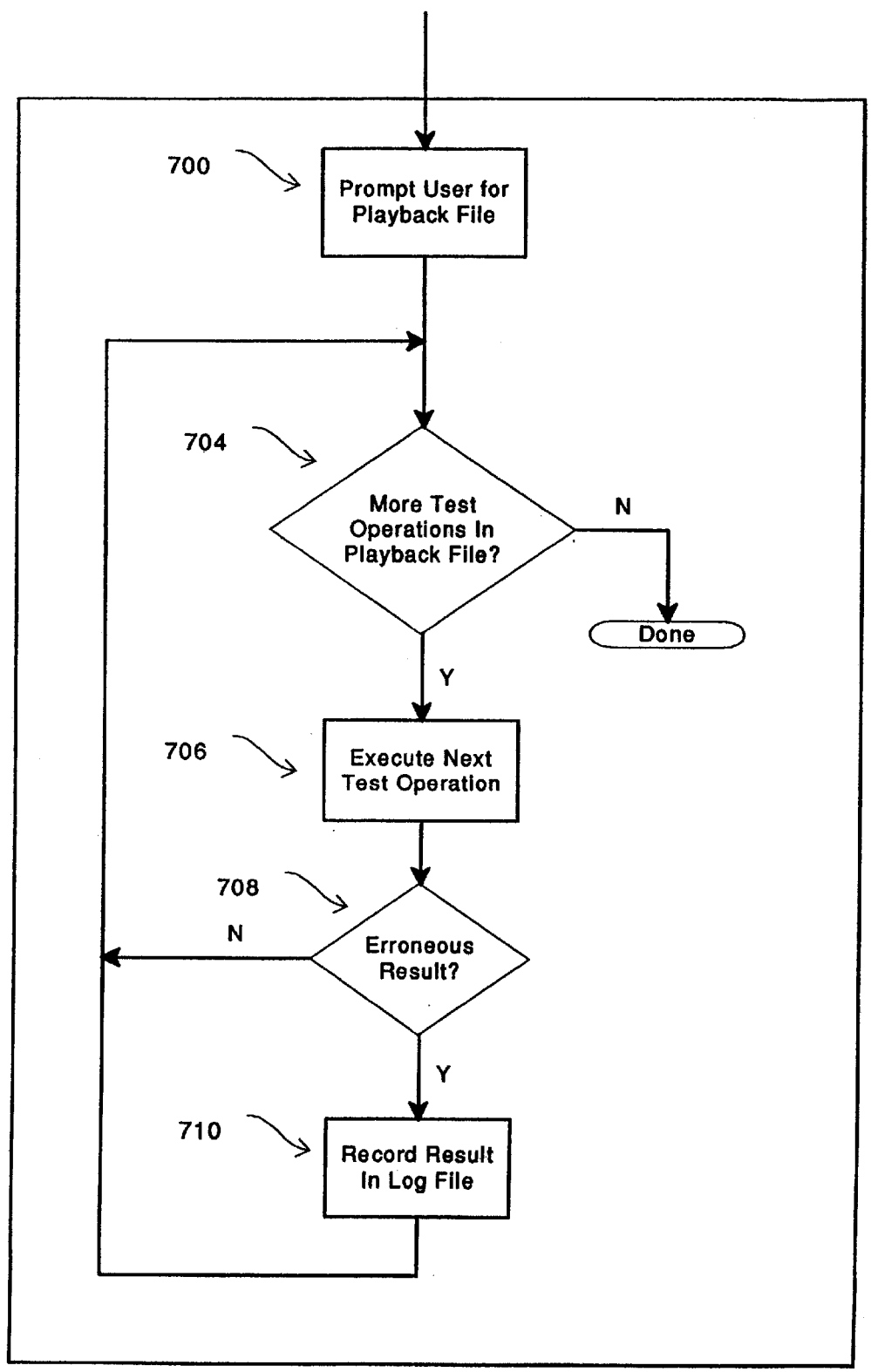
FIG. 7 is a flowchart showing additional detail of the playback test operation of FIG. 5.

FIG. 7 depicts a flowchart providing additional details of the operation of elements 516 of FIG. 5, which performs playback auto-test mode processing. Element 700 of FIG. 7 is first operable to prompt the user to enter the name of a previously recorded playback file. The playback file contains information used by the methods of the present invention to reproduce a previously recorded test sequence. The playback auto-test mode is most typically used to reproduce a problem previously produced in a sequence of test steps (such as the pseudo-random auto-test mode or manual playback creation mode discussed above) and recorded in a playback file. Test sequence reproducability is key to the product development group in locating and repairing programming errors (bugs) causing the reported problem.

Elements 704–710 are next operable repetitively until testing procedures have been completed. Element 704 is operable to determine whether additional test operation objects remain to be processed from the playback file. Each entry in the playback file represents the invocation of a selected test operation object. Element 704 then determines whether additional entries are yet to be processed in a selected playback file. If no further test operation objects remain unprocessed, processing of the playback auto-test mode is completed and testing halts. If additional entries remain in the currently selected playback file, element 706 is next operable to invoke the execute interface function to perform the next selected test operation.

Element 708 is operable to determine whether the result of the previous execute interface function indicated success or failure. If the execute interface function returned a successful completion code, processing continues by looping back to element 704 to thereby continue the playback auto-test mode by selecting the next test operation from the playback file. Conversely, if the execute interface function invocation indicates an erroneous result, element 710 is next operable to record the erroneous result in a results log file. Processing then continues by looping back to element 704 to complete the playback auto-test mode processing of the selected playback file.

Figure 8:
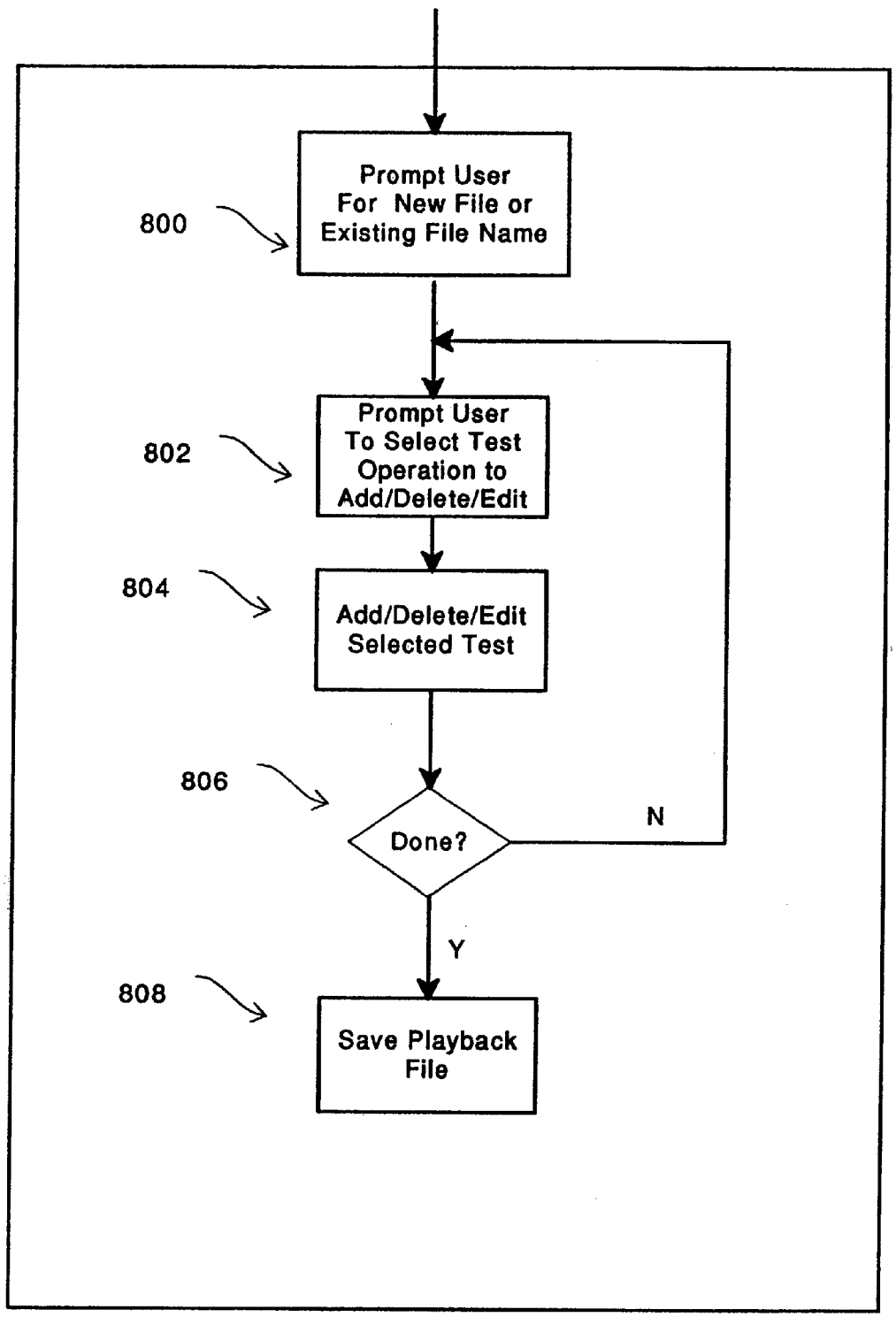
FIG. 8 is a flowchart showing additional detail of the manual test operation of FIG. 5.

FIG. 8 is a flowchart providing additional detail of the operation of manual playback creation mode element 518 of FIG. 5. Element 800 of FIG. 8 is first operable to prompt the user to select a particular pre-existing playback file (for editing) or to create a new playback file. Next, element 802 prompts the user to identify a test operation object from a menu of all defined and instantiated test operation objects. Element 804 is next operable to add the selected test operation object to the current playback file (alternatively, the user may identify a test operation object to be deleted from the playback file, to be edited, or to be moved to another position in the playback file). Element 806 determines whether the user wishes to further edit the playback file or whether all changes are done. If further changes are desired, execution continues by looping back to element 802. If no further changes are desired, the method completes with processing by element 808 to save the new playback file to mass storage associated with the present invention.

TEST OPERATION OBJECTS:

Test operation objects are objects derived from a standard C++ class definition provided by the library (DLL). The object class may be used by the product development group to derive specific definitions and instantiations of test operation objects. The test tools of the present invention define a minimum of four interface function methods for use by the testing tools in performing the required test operation. The product development group members define their own test operation object class which implements at a minimum the execute interface methods described above. The other three of the four basic interface methods are provided with default definitions in the object class. The programmer may use the standard object definitions of the three other interface methods, or may replace them (override them) as appropriate for the particular objects test goals. The specific functionality within each of the four basic interface functions is provided by the product development group engineer to actually perform the required test operation and return a success or failure result. The basic four interface functions are: execution, data input, file and memory I/O, and rules.

The execute interface function must be provided in the derived class object. There is no default implementation of an execute function because the execute function contains all of the code necessary to perform a particular test operation. The execute interface function performs only the precise function calls required to execute the desired test operation function. Any input or output requirements are handled through the data input or file and memory I/O interface functions. The following is a simple example of an execute function used to perform an open file operation.

```
DWORD COpenFile::Execute()
{
    // Log will write the provided string to the logfile and return FALSE if the
    // operation should skip execution.
    if (Log(m_strOperationName))
    {
        GetApplication()->OpenFile(m_strFileName);
    }
    return Error();    // Return success or failure.
}
```

This exemplary execute function (the Execute function of the COpenFile test operation object) simulates a users selection of a file/open menu item exactly as though the user has selected the file/open menu item by operation of the application program.

At least two functions may be defined as part of the data input interface method. These functions are invoked indirectly by the invocation of the execute interface function when data input is required. A first function in the data input method can automatically generate a desired input value. A second function in the data input interface method allows manual input of a data value by prompting the test user. The following are example functions implementing a typical automatic generation, and manual, data input function.

```
BOOL COpenFile::Generate()
{
    CFileList *pFileList = NULL;
    // Ask the application for a list of files with a certain extension.
    pDileList = GetApplication()->FindFiles("*.txt");
    // If there are none, then fail.
    if (pFileList()->Empty())
        return FALSE;
    // Pick one of the files randomly from the list.
    nPickedFile = Random(pFileList()->NumberOfFiles());
    // Get the name of the picked file and save it.
    m_strFileName = pFileList()->GetFileName(nPickedFile);
    return TRUE;
}
BOOL COpenFile::Manual()
{
    CFileDialog dlgFileDialog;
    BOOL bRet = FALSE;
    // Bring up a dialog box asking the user for a file name.
    if (IDOK = = dlgFileDialog.DoModal())
    {
        // If the user clicks 'OK' save the new file name,
        // otherwise FALSE will be returned and the edit/create
        // operation will be canceled;
        m_strFileName = dlgFileDialog.GetFileName();
        bRet = TRUE;
    }
    return bRet;
}
```

In general, the Generate function is used by the testing tools to create pseudo-random test data input values. Other methods besides random generation may be used in a Generate function to automatically create appropriate test values. For example, sequencing through a variety of test values from low to high may be appropriate in some test cases. The automatically generated values are also logged in the playback file so that any problems revealed by the test sequence with specific input values may be easily reproduced.

The exemplary Manual input function presents exemplary code used to display a dialog box in which a test user of the application may enter data input values to proceed in the test process. As in the Generate exemplary function, any data input value received is logged in the playback file so that a test sequence may be easily reproduced.

The file and memory I/O function interface method permits simulation of input data values retrieved from temporary files or memory buffers. Such file or buffered I/O requests generated by invocation of the execute function of the test operation object are satisfied by simulating the writing and reading of values to and from files or memory buffers by the application program. By simulating these operations, the values used may be captured and thereby reproduced in later invocations of the playback file (i.e. to reproduce a test sequence which resulted in a failure).

The rules interface method comprises a set of functions which determine the propriety of running a particular test operation function, or group of test operation functions in light of the current context of the application program, or the context of the test processing. The rules interface method is discussed below in additional detail.

TEST OPERATION OBJECT GROUPS:

As a convenience to the testing user of an application program with the test tools embedded according to the present invention, functions are provided in the test operation object library (DLL) of the present invention to permit a development engineer to associate related test operation objects into "groups". Function calls in the DLL permit a development engineer to create new group definitions. Each group becomes associated with a unique group identifier. A textual name may be associated with each group for use in prompting a test user to enter parameters associated with the group. Function calls within the DLL used to define each test operation object include a parameter to identify the predefined group with which the test operation object is to be associated.

Each of the groups defined by the development engineer may be associated with a weighting value. Weighting values are used in conjunction with the pseudo-random auto-test mode described above to adjust the frequency distribution of random calls to the various test operation objects. The weighting value is used to determine the relative number of calls to test operation objects within one group as distinct from the number of calls to test operation objects associated with another group. In other words, the development engineer may define one group to be "randomly" selected more frequently than is another group. In addition to the group weighting, each test operation object within a group may be weighted further to determine its relative frequency of invocation as compared to each other test operation object in the same group.

EMBEDDING TEST OBJECTS:

The test objects defined by the product development team must be defined and instantiated in the initialization code of the application program as shown in element 502 of FIG. 5. The following C++ code sample is exemplary of an approach to embedding the test object definition and instantiation in the application program. In the following exemplary code, the test methods and structures of the present invention are referred to by the Microsoft trade name TestWizard. It is presumed in the exemplary code below that the appropriate header file(s) have been included to provide the required object class definitions.

```
// Create the test suite object which defines the parameters of the pseudo-random
// auto-test mode of operation. This object defines the groups of test operations
// and the relative weights among the groups and operations.
m_pTestSuite = new CTestSuite(MAX_GROUP, MAX_OPERATION, "c:\\wiz");
// Create the TestWizard object - the heart of the methods and structure of the
// present invention.
m_pTestWizard = new CTestWizard;
// Define five groups and their respective weights in the test suite object
// (initially, default values are used for the group weights) in tho test suite object.
// The five groups are:
// CREATEGROUP
// FILEGROUP
```

-continued

```
//MANIPGROUP
// LAYERGROUP
// SELECTIONGROUP
m_pTestSuite->SetGroupWeight(CREATEGROUP, DEFAULT_WEIGHT);
m_pTestSuite->SetGroupWeight(FILEGROUP, DEFAULT_WEIGHT);
m_pTestSuite->SetGroupWeight(MANIPGROUP, DEFAULT_WEIGHT);
m_pTestSuite->SetGroupWeight(LAYERGROUP, DEFAULT_WEIGHT);
m_pTestSuite->SetGroupWeight(SELECTIONGROUP, DEFAULT_WEIGHT);
m_pTestWizard->SetTestSuite(m_pTestSuite, ".sui", ".wiz");
m_pTestWizard->SetApplicationName("DemoApp");
m_pTestWizard->SetPlaybackExtension(".wiz");
// Get access to the TestWizard User Interface object
m_pTestWizard->GetTestWizardUI(&ptestWizUI);
// Define the pages to be displayed in the UI along with the OPTIONS page
ptestWizUI->AddPage(new CCreatePage(ptestWizUI));
ptestWizUI->AddPage(new CFilePage(ptestWizUI));
ptestWizUI->AddPage(new CManipulationPage(ptestWizUI));
ptestWizUI->AddPage(new CLayerPage(ptestWizUI));
ptestWizUI->AddPage(new CSelection(ptestWizUI));
// Add test operation objects to the FILE group. The test operations are:
// NEWOP (use the CNewFile test operation object)
// OPENOP (NotYet Implemented)
// CLOSEOP (use the CCloseFile test operation object)
// SAVEOP (use the CSaveFile test operation object)
// SAVEASOP (Not Yet Implemented)
m_pTestSuite->SetOperation(FILEGROUP, NEWOP, new (SKETCHNEWGROUP)
    CNewFile(m_pTestWizard));
m_pTestSuite->SetOperation.(FILEGROUP, OPENOP, new
    CNYIOperation(m_pTestWizard));
m_pTestSuite->SetOperation (FILEGROUP, CLOSEOP, new (SKETCHNEWGROUP)
    CCloseFile(m_pTestwizard));
m_pTestSuite->SetOperation(FILEGROUP, SAVEOP, new (SKETCHNEWGROUP)
    CSaveFile(m_pTestWizard));
m_pTestSuite->SetOperation(FILEGROUP, SAVEASOP, new
    CNYIOperation(m_pTestWizard));
// Invoke the UI to display the user interface and begin testing.
m_pTestWizard->invokeUI();
```

The above, exemplary intialization code may be inserted in the application program at any desirable position in the application. The invocation of the TestWizard User interface (to commence testing operations) may be inserted in the application at any desirable position including: at startup of the application as shown above, following operation of some particular function, as an option in the standard user interface of the application (i.e. in a menu item of the application program), or at any other desirable point in the operation of the program.

The SetOperation function calls specify the test operation object (third parameter) to be associated with the group and operation specified by the first two parameters. The test operation objects are derived from a COPERATION test operation object class defined by the methods and structures of the present invention (and included by appropriate header files in the exemplary code above). The CNewFile, CCloseFile, and CSaveFile test operation objects are derived from the COperation object class. The CNYIOperation subclass of the COPERATION class is defined by the methods and structures of the present invention to provide a default test operation object as a place holder for functions not yet implemented by the development group.

A COPERATION class object may be derived from the base class in accord with the following C++ code sample:

```
CNewFile::CNewFile (CTestWizard *pTestWizard) : COperation (pTestWizard)
{
    // Body of code to implement a new file operation
}
```

The execute interface method function must be implemented in every derived object. A skeletal exemplary execute function might appear as follows:

```
DWORD CNewFile::Execute()
{
    CString strMessage;
    strMessage.Format("File New Called\n");
```

-continued

```
    if(Log(strMessage))
        AfxGetMainWnd()->SendMessage(WM_COMMAND, ID_FILE_NEW);
    return Error();
}
```

One of ordinary skill in the art will recognize that the above exemplary code segments are intended only as demonstrative of the structure of actual code used to implement and utilize the features of the present invention. Many assumptions regarding variable types and scopes are made in the above code segments. One of ordinary skill in the art will readily recognize the intended meaning of the code sample, namely: exemplary pseudo-code suggestive of the intended use of the methods and structures of the present invention.

Figure 9:
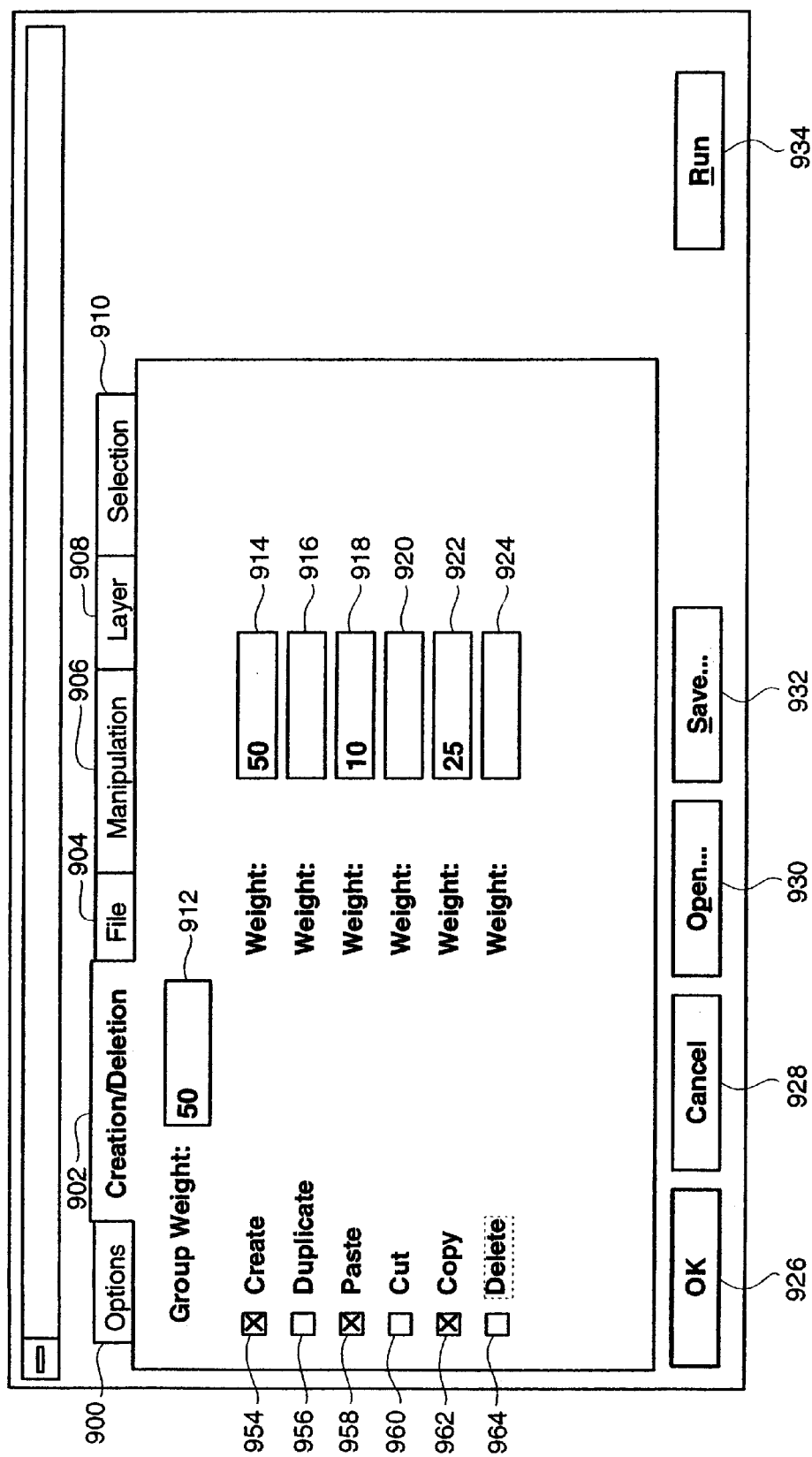
FIG. 9 is a screen display showing an exemplary user interface which permits the user to define group and test operation weights for the random test operations of FIG. 5.

PSEUDO-RANDOM AUTO-TEST MODE USER INTERFACE:

FIG. 9 is an exemplary display screen used in the test tools and methods of the present invention to permit the test user to define the weight values used for each test operation object and for each group of test operation objects. The set of test operation objects and their groupings are defined by the product development group when the objects are embedded in the source code of the application program (as discussed above with respect to FIGS. 2 and 4. Label 900 of FIG. 9, discussed in detail below with respect to FIG. 10, indicates the hidden "OPTIONS" display screen used to set global option values for the pseudo-random auto-test mode operation. In FIG. 9, four exemplary groups have been defined as indicated by the labels 902–910. Specifically the groups are named: "CREATION/DELETION" (label 902), "FILE" (label 904), "MANIPULATION" (label 906), "LAYER" (label 908), AND "SELECTION" (label 910).

The display screen of FIG. 9 is an exemplary screen for entry of weighting values by the test user to be associated with the test group named "CREATION/DELETION." The group weight value entered in field 912 sets the group weight for this test operation group relative to all other test operation groups defined by the product development group. For example, if the other four groups (labeled "FILE", "MANIPULATION", "LAYER", and "SELECTION") have group weights of 75, 25, 100, and 125, respectively, then the test operations in this test group ("CREATION/DELETION") will be selected (50/(50+75+25+100+125)) times or 13.33% of the pseudo-random selections.

Within each test group, each test operation may be individually weighted and enabled/disabled. In the "CREATION/DELETION" test group of FIG. 9, there are six test operations labeled: "CREATE", "DUPLICATE", "PASTE", "CUT", "COPY", and "DELETE." These six test operations may be individually enabled or disabled by checking or clearing the associated check box, 954–964, respectively. In addition, each of these six test operation may be individually weighted by entering a weight value in the associated weight field, 814–924, respectively. The enabled test operations within the group will be pseudo-randomly selected according to the ratio of their respective weights whenever their containing group, "CREATION/DELETION", is selected. In other words, the "CREATE" test operation will be selected 50/(50+10+25) times, or 58.82% of the times when the "CREATION/DELETION" group is selected. Since the weighting of the group is multiplied by the test operation weight, the "CREATE" test operation will be selected 7.84% of the time among all defined and enabled test operation objects.

Button fields 926–932 are used to save and retrieve the values and settings entered in the above discussed fields (912–924 and 954–964) for future reference. Use of buttons such as these are well known to those of ordinary skill in the art and need not be discussed further.

Button field 934 begins the pseudo-random auto-test mode operations as defined by the parameters entered in the above discussed fields (912–924 and 954–964). FIGS. 5–8, discussed above, present the detailed operation of the pseudo-random auto-test mode.

Figure 10:
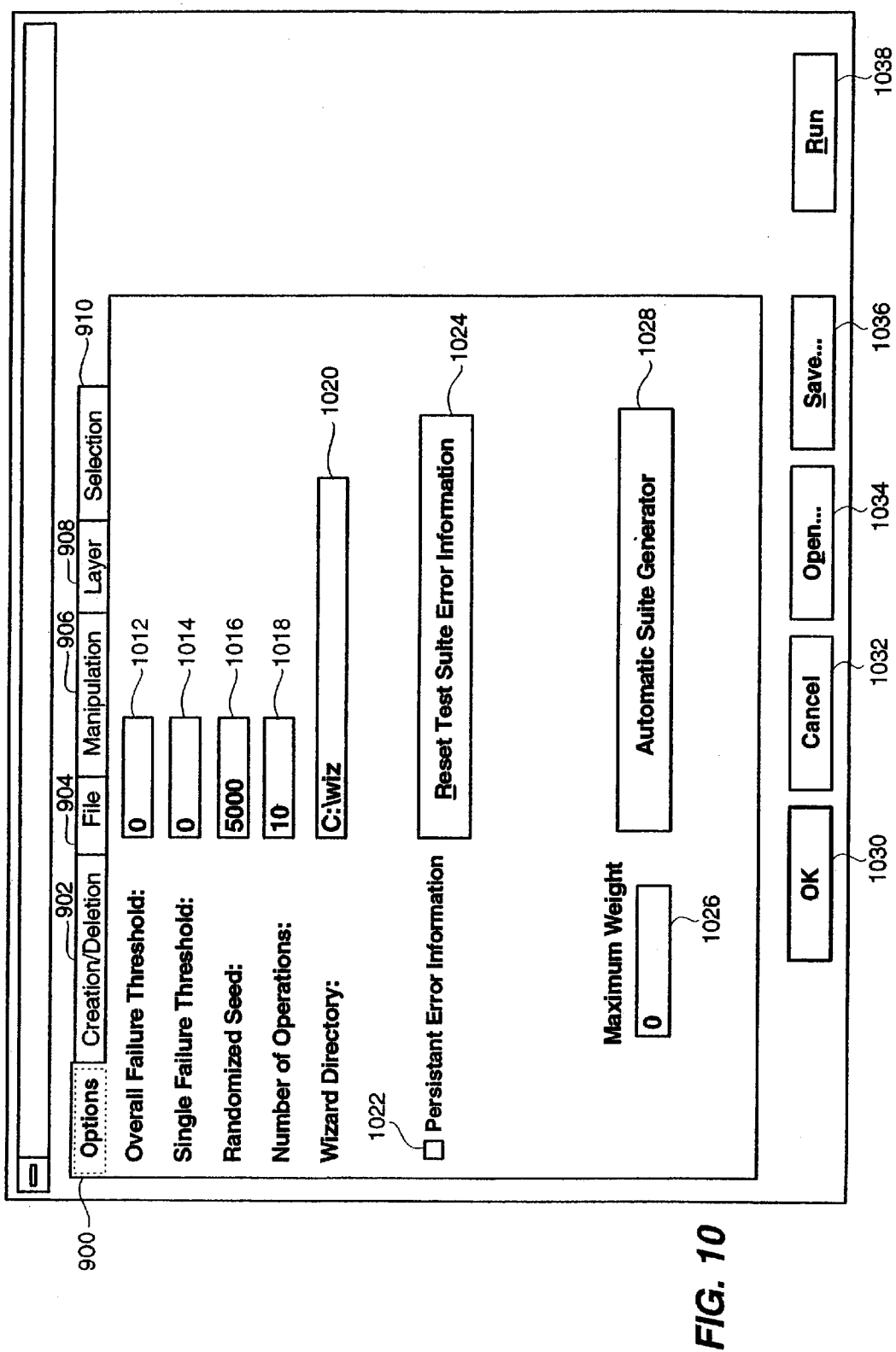
FIG. 10 is a screen display showing an exemplary user interface which permits the user to define options for the random test operations of FIG. 5.

FIG. 10 is an exemplary display screen used to prompt the test user of the present invention to enter parameters (options) used in the pseudo-random auto-test mode of operation. Label 900 of FIG. 10 indicates the semantic use of the screen display for entry of "OPTIONS" in the running of the pseudo-random auto-test mode. Labels 902–910, as discussed above with reference to FIG. 9, indicate the names of exemplary groups of test operation objects as defined by the development.

Fields on the "OPTIONS" screen of FIG. 10 are used to define parameters which control the operation of the pseudo-random auto-test mode of the present invention. Field 1012 is used to enter the overall error or failure threshold value. This value determines the maximum number of erroneous results permitted of all test operation invocations before the pseudo-random auto-test mode is terminated. Use of this overall threshold value is discussed above with respect to element 608 of FIG. 6A and elements 622 and 624 of FIG. 6B. Field 1014 of FIG. 10 is used to enter a single failure threshold value for use in the methods of the present invention as discussed above with reference to FIGS. 5–8. The single failure threshold value is used to determine whether any particular test operation has exceeded this failure threshold. The test tools and methods of the present invention account for the number of test operation failures associated with the invocation of each test operation object as well as the total number of test failures. This threshold value is used in a manner similar to that of the overall test failure threshold to terminate the invocation of a particular test operation object in the pseudo-random auto-test mode of operation. As shown in FIG. 10, threshold values of zero (or less) will terminate the pseudo-random auto test mode (field 1012) or the continued invocation of a particular test (field 1014) as soon as any failure occurs in the invocation of a test operation object.

Field 1016 is used to enter the random number generator seed value for the start of the pseudo-random test selection. To reproduce a particular "random" test sequence, the user may enter the same seed value as used in a previous run of that test sequence. Field 1018 is used to enter the total number of test operation objects to be invoked for the pseudo-random test sequence. The pseudo-random auto-test mode will terminate operation after this number of test operation objects are invoked (regardless of the success or failure of the test operation). Field 1020 specifies the directory on a mass storage device associated with the computing environment running the test. Files used in the operation of the pseudo-random auto-test mode (playback and result log files, etc.) will be stored in this directory for later reference.

Check box field 1022 is used to enable the persistent storage of single operation threshold values and error counts from previous invocations of test operations to accumulate the error counters. When field 1022 is checked, test operations which previously produced erroneous results exceeding the designated threshold value are skipped. Otherwise, all test operations are invoked normally. This feature is useful to proceed beyond known problems in a test sequence to reveal other new problems. This "persistent" error information is retained and accumulated through all test operation invocations and through a plurality of test sequence runs. Field 1024 is a button which, when selected ("clicked") by the user, will clear the persistent log of erroneous results to again permit testing of all operations in a test sequence of the pseudo-random auto-test mode.

Field 1026 is used to enter a maximum group/operation weight value. This maximum value is used to automatically generate weighted values for all groups and for all operations within a group when button 1028 is clicked.

Button fields 1030–1036 are used to save and retrieve the values and settings entered in the above discussed fields (1012–1028) for future reference. Use of buttons such as these are well known to those of ordinary skill in the art and need not be discussed further.

Button field 1038 begins the pseudo-random auto-test mode operations as defined by the parameters entered in the above discussed fields (1012–1028). FIGS. 5–8, discussed above, present the detailed operation of the pseudo-random auto-test mode.

Figure 11:
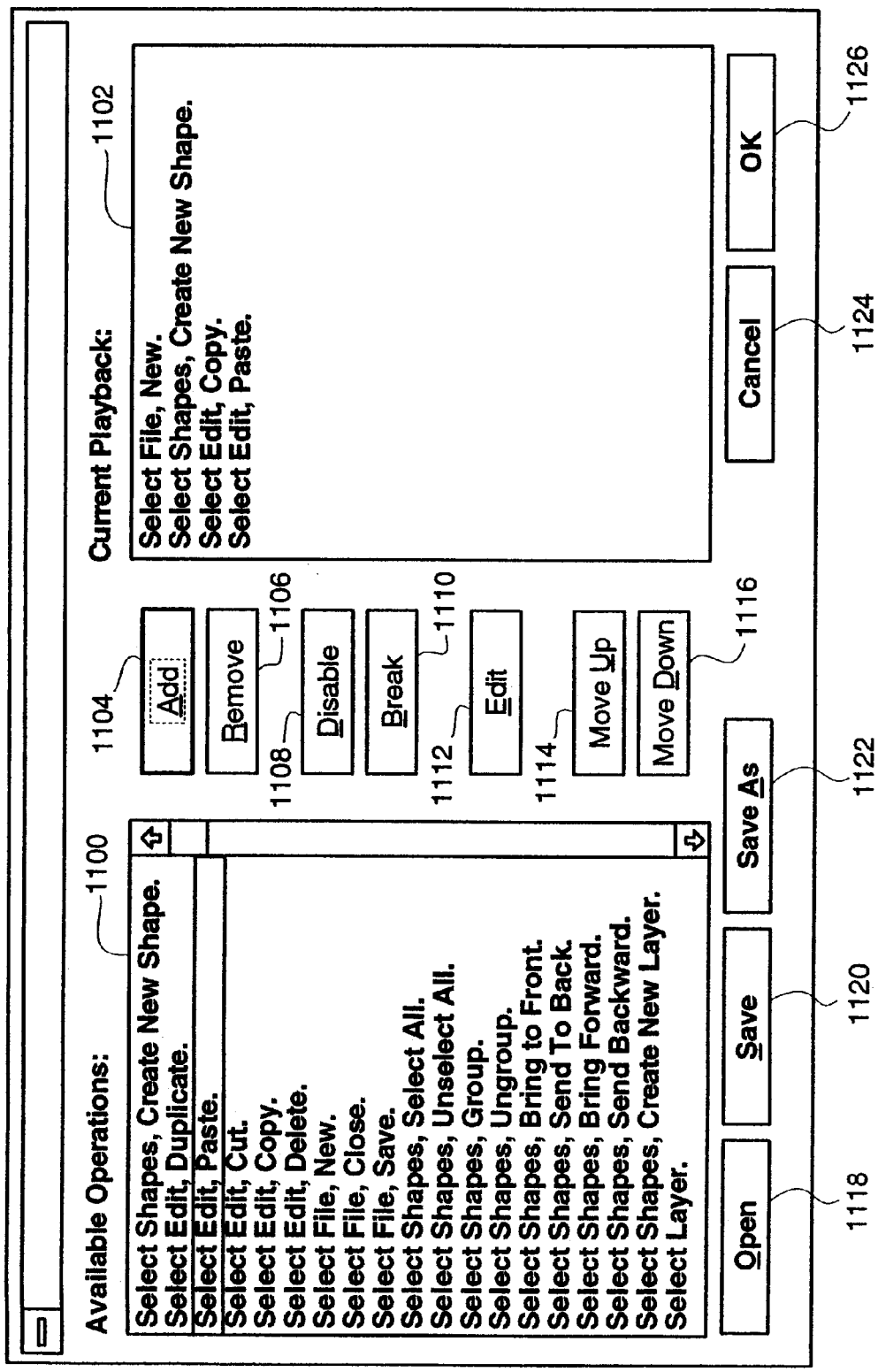
FIG. 11 is a screen display showing an exemplary user interface which permits the user to customize a playback test sequence for the playback test operations of FIG. 5.

PLAYBACK FILE EDITING USER INTERFACE:

FIG. 11 is an exemplary display screen designed to permit a test user to edit the contents of a previously recorded playback file. In the playback file creation mode of operation, a test user edit a previously recorded playback file to customize the test sequence, or create a new test sequence. In the screen display of FIG. 11, a list of available test operations 1100 is positioned on the left side of the screen. A list of the test operations currently selected for the test sequence, the current script 1102, appears on the right side of the screen. A user may highlight ("clickon") a desired test operation from the list of available test operations, then click on the "ADD" button 1104 to add the highlighted test operation to the current playback 1102. Conversely, the user may highlight a test operation in the current script 1102 and click the "REMOVE" button 1106 to remove the highlighted test operation from the current script 1102.

In addition to the "ADD" and "REMOVE" functions, a highlighted test operation in the current playback 1102 may be skipped by clicking the "DISABLE" button 1108. A pause in the test sequence may be added to the current script by highlighting a test operation in the current script 1102 and clicking the "BREAK" button 1110. This marks the highlighted test operation such that the operation may pause before executing.

Any test operation in the current playback 1102 may be altered by highlighting the test operation and clicking on the "EDIT" button 1112.

Test operations in the current list 1102 may be moved up or down in the current list 1102 relative to other test operations by highlighting the test operation to be moved and then clicking on the "MOVE UP" button 1114 or "MOVE DOWN" button 1116.

Button fields 1118–1126 are used to save and retrieve the values and settings entered in the above discussed fields (1100–1102) for future reference. Use of buttons such as these are well known to those of ordinary skill in the art and need not be discussed further.

Figure 6B:
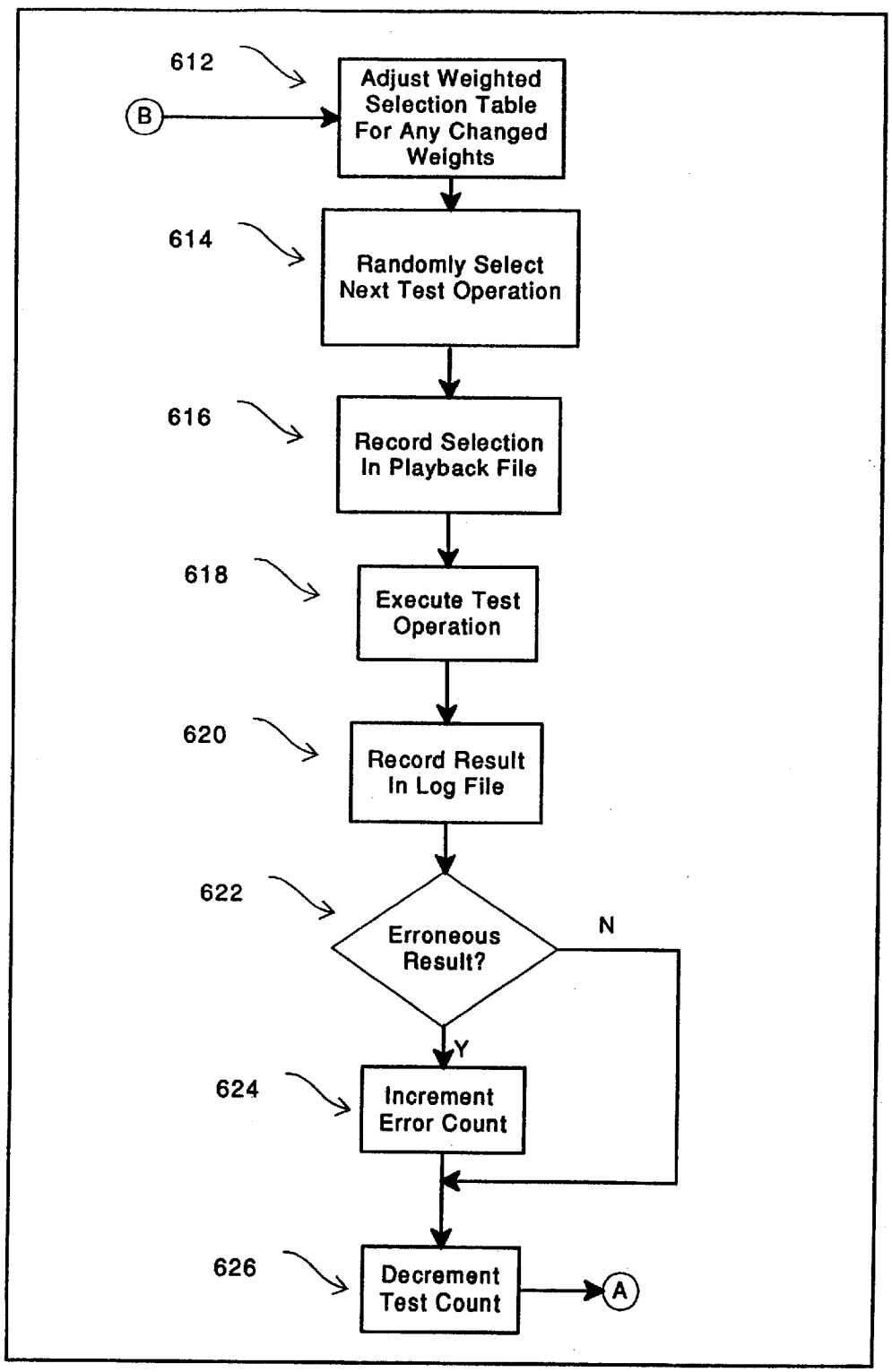
FIG. 6B is a flowchart showing additional detail of the random test operation of FIG. 5.

RULES:

As shown in FIG. 6B, element 612 is operable to adjust the weight selection tables used in pseudo-random auto-test mode for any changed weights. Rules as used herein, are functions which are invoked in association with the invocation of the execute interface function wherein the rules function modify the current weight value for one or more test operation objects or groups. By modifying the weight value of a particular test operation object or a particular group, the rules function may alter the frequency with which certain test execute interface functions are invoked. The conditions in which the rules function will modify a weight value for a selected test operation object or group, may be completely defined by the code implementing the rules function as written by the product development group.

Rules, as defined herein, may be used for example, to reduce the frequency of a particular test operation depending on the current state of operation of the application program, or for example, depending upon the current state of progress in running the test application program. Changing the frequency of invocation of a particular test operation object or group may include, for example, reducing its frequency of invocation to zero (i.e. "not available"). For example, functions which perform an edit menu copy or paste function may be valid only when a file is "open" in the context of the application program. Rule functions may be used to assure that the execute interface functions for the copy or paste test operation objects will never be called until after the test operation object execute interface function for the files/open menu operation is invoked successfully.

The rules interface functions for each test operation object are invoked to adjust the weighted selection table before the next random selection is made in the flowcharts of FIGS. 6A and 6B.

What is claimed is:

1. A software product having an application program including:

application program objects operational when executed by a computing environment to direct the computing environment to perform an application function;

test objects embedded within the application program and operational when executed by the computing environment to direct the computing environment to test the application program objects; and a storage medium operational to store the application program objects and the test objects.

2. The software product of claim 1 wherein the test objects are derived from a dynamic link library invoked by the application program.

3. The software product of claim 2 wherein the test objects are operational when executed by the computing environment to direct the computing environment to randomly and automatically test the application program objects.

* * * * *